July 22, 1969  L. R. VAN LANIGAN  3,456,348

MOUTH EVACUATOR

Filed July 13, 1966

*INVENTOR.*
LOUIS R. VAN LANIGAN

BY *William A. Murray*

ATTORNEY 3,456,348
MOUTH EVACUATOR
Louis R. Van Lanigan, 1518 5th Ave.,
Moline, Ill. 61265
Filed July 13, 1966, Ser. No. 564,962
Int. Cl. A61c 17/04
U.S. Cl. 32—33                                    11 Claims

ABSTRACT OF THE DISCLOSURE

A mouth evacuator for use in dental work that is composed of a U-shaped metal plate extending over the teeth and having a soft flexible plastic liner that is self-setting to the shape of the teeth and is therefore capable of holding the plate on the teeth. Flexible suction tubes are supported on the plate and fit around the teeth and rest on the floor of the mouth.

---

This invention relates to a mouth evacuator used in dental work and more particularly to a structure that locks or retains it within the mouth comfortably. Also, the invention relates to a method of positioning and holding the evacuator within the mouth on opposite of side worked, without bulk or interference and requiring no assistant.

It is the primary object of the invention to provide a new and novel evacuator that is composed basically of a U-shaped member that has its opposite vertical sides adapted to extend on opposite sides of a portion of the lower teeth. On the inside of the U-shaped member is a liner adapted to engage and grip the teeth and is composed of a self-setting material that when applied to the teeth is in a fluid plastic or elastic condition. The U-shaped member is pressed downwardly on the teeth and the self-setting fluid material flows around and in between the teeth adapting itself to the teeth. When the liner material sets up or stiffens, the inside of the liner adapts itself to the shape of the teeth and is retained on the teeth. Tube means are provided on the U-shaped member and includes a pair of rigid tubes on opposite sides of the teeth and directed downwardly toward opposite sides of arch and flexible continuations of the rigid tubes that extend around the lower teeth and on the floor of the mouth. The flexible tubes are perforated to provide fluid inlets for evacuating materials from the mouth. The opposite ends of the rigid tubes are connected to a suction line that is of conventional nature.

It is a further object of the invention to provide a method of retaining a mouth evacuator which is comfortable and retains position without assistance in a patient's mouth, which comprises compressing a self-setting fluid or elastic material between the evacuator and teeth for a sufficient time to permit the fluid to set or stiffen and that upon stiffening adapts itself in between the teeth to thereby grip the teeth and retain the evacuator on the teeth and within the mouth and still can be easily removed and reinserted repeatedly.

Other objects and advantages of the invention will become apparent to those skilled in the art as the nature of the invention is better understood from the following description and as shown in the accompanying drawings.

Figure 1:
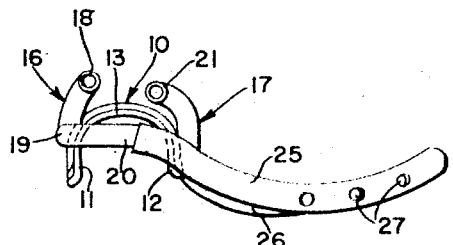
Figure 2:
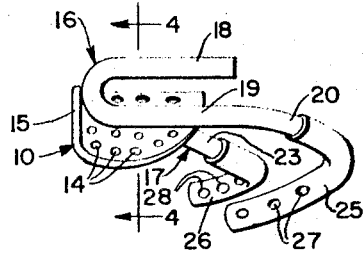
Figure 6:
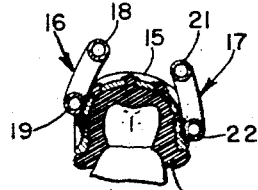
Figure 4:
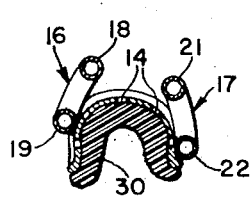
Figure 3:
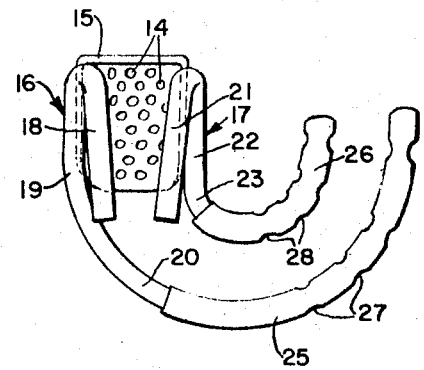
Figure 5:
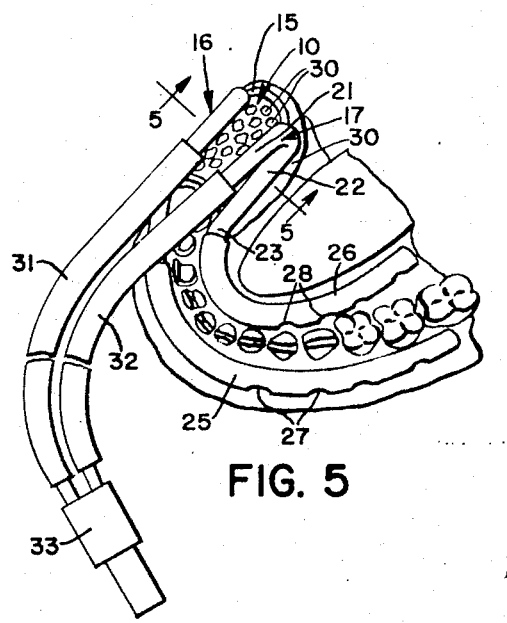

FIG. 1 is an end view of the evacuator.
FIG. 2 is a side view of the evacuator.
FIG. 3 is a plan view of the evacuator.
FIG. 4 is a sectional view taken substantially along line 4—4 of FIG. 2 and showing the liner therein in an uncured or fluid condition.
FIG. 5 is an overhead perspective view of the evacuator as it is applied in the mouth or a section of teeth.
FIG. 6 is a sectional view taken substantially along the line 6—6 of FIG. 5.

The evacuator is composed of a U-shaped metal plate or member 10 having a pair of vertical sides 11, 12 adapted for disposition on opposite sides of the teeth and an overlying bite portion 13. The metal plate 10 is perforated at 14 and may be made of stainless steel or may be chrome plated or rigid plastic. The plate 10 has a rounded bead 15 around its edge that gives stiffness to the plate and also prevents accidental cutting or abrading the skin within the mouth.

Tube means are supported on the sides 11, 12 of the plate 10 and includes a pair of U-shaped rigid tubes 16, 17. The outer tube 16 has an upper horizontal leg portion 18 and a lower horizontal leg portion 19 with a downwardly and inwardly curved portion 20 that normally terminates in the forward outer portion of the mouth. The inner tube 17 is composed of an upper horizontal leg portion 21 and a lower leg portion 22 having a forward inwardly and downwardly curved portion 23 that normally terminates adjacent the front teeth and internally thereof.

Supported on the ends 20, 23 of the respective tube portions 19, 22 is a pair of flexible plastic tube extensions 25, 26 having perforations 27, 28 respectively therein that serve as inlets. The extensions are flexible and conform to the shape and contour of the mouth. The rigid tubes 16, 17 serve as supports on the plate member 10 for the flexible tubes 26, 27. The terminal ends of the tubes 16, 17 are directed downwardly so that the flexible extensions 26, 27 are always held on the floor of the mouth and between cheek and ridge of outer teeth.

The plate 10 is provided with a liner 30 that fits between the teeth and the plate. The liner 30 is composed of a self-setting material that is applied to the underside of the plate 10 in a semi-fluid or viscous state, such being shown in FIG. 4. When applying the evacuator to the teeth, the plate member 10 is pressed downwardly to force the liner into the various crevices and openings of the teeth to thereby shape the liner to the shape of the teeth. At this time portions of the liner material is forced through the perforations 14 to thereby effect a gripping action with the plate 10. The liner 30 may be of a fast setting rubber or plastic material or may be of a plaster material. Rubber or plastic is preferable from a comfort standpoint since it will yield for purposes of removing the evacuator from the mouth.

The evacuator is applied in the following method. The liner 30 is applied to the inner side of the plate 10 in an unset or uncured state. The plate 10 is applied with downward pressure to the posterior lower teeth on one side of the mouth until the liner 30 flows through the openings 14 and appears around the edge of the bead 15. This will insure flow of the liner material between and into the teeth crevices. A sufficient time is then permitted to permit the liner 30 to set or obtain its permanent shape at which time the plastic tubes or extensions 26, 27 may be added. Once the liner obtains its permanent shape, the evacuator may be removed and replaced as desired without losing the tight fit on the teeth. Consequently the extensions may be added while the evacuator is in or out of the mouth. A pair of flexible suction tubes 31, 32 are then connected to the upper leg portions 18, 21 of the rigid tubes 16, 17 and extend outwardly of the mouth. The tubes 31, 32 extend to a common fitting 33 adapted for connection to a suction tube, not shown.

The evacuator may be taken or removed from the mouth during one visit to the dentist and reappiled at a later visit to the dentist. Upon work being completed, the plastic liner 30 may be removed from the plate 10 merely by pulling on it. The plate 10 being chrome plated or of stainless steel will have no direct adhesion to the liner 30 but is held on the liner only by the mechanical means of passing portions of the liner through the perforations 14 and around the edge of the plate. It should also be recognized that the evacuator will be placed on the side of the mouth opposite to that on which work is being done. Also, it should be recognized that an evacuator may be applied to the front lower teeth and the rigid tubes and the tube extensions would be shaped slightly but obviously different to conform to the then required contour of the mouth.

What is claimed is:

1. A mouth evacuator for use in dental work comprising: a U-shaped plate member adapted to extend over portion of the teeth with opposite vertical sides of the plate member disposed on the internal and external sides of the teeth; a soft internal liner on the plate member adapted to shape itself to conform to the shape of the teeth to thereby grip the teeth for retention of the plate member thereon; a pair of rigid tubes fixed to the sides of the plate member for passing fluid from inlet ends of the tubes to outlet ends; a pair of flexible tubes supported on the inlet ends and extending therefrom around the mouth on the internal and external sides of the teeth, the flexible tubes having a plurality of suction inlets therein; and suction means connected to the outlet ends of the rigid tubes for drawing fluid from the mouth.

2. A mouth evacuator for use in dental work comprising: a rigid U-shaped member adapted to extend over a portion of the teeth having depending portions thereof on opposite sides of the teeth, said member further having a relatively soft flexible liner means adapted to shape itself to the shape of the teeth to thereby grip the teeth for retention of the member thereon, said member having tube support means on opposite sides thereof with each having one portion directed downwardly and a portion extending and opening forwardly; tubes supported on and extending from the one portions and terminating in perforated sections extending in the mouth and on the floor thereof; and suction means for drawing fluid through the tube means from the mouth.

3. The structure as set forth in claim 2 in which the liner means is a self-setting material whereby the liner means and member may be placed on the teeth when the material is soft and may be retained on the teeth by the liner means upon the liner material setting to the shape of the teeth.

4. The structure as set forth in claim 3 in which the member is perforated to permit flow of the liner material into the perforations as it is pressed on the teeth.

5. The structure as set forth in claim 3 in which the self-setting material is a natural or synthetic resin that is self-setting.

6. The structure as set forth in claim 2 in which the tube means includes a pair of tubes supported on the member and directed downwardly on opposite sides of the teeth whereby the flexible tube means are directed downwardly for retention on the floor of the mouth and for self-adjusting themselves during swallowing.

7. The structure as set forth in claim 2 in which tube supports on and hollow tube supported on each side of the U-shaped member with a lower leg of each being inclined downwardly and an upper leg of each extending and opening forwardly.

8. The structure as set forth in claim 7 in which the lower legs are also arcuate shaped to conform to the normal arcuate contour of a portion of a row of teeth.

9. The structure as set forth in claim 2 in which the member is perforated and the liner means is composed of a self-setting material applied to the surface of the teeth in a fluid or plastic condition with part thereof penetrating the perforations to lock the liner means to the plate.

10. The structure as set forth in claim 2 in which the support means is a pair of U-shaped rigid tubes fixed to the member on opposite sides of the teeth with the lower leg portion of each being connected to a flexible tube and the upper leg portion of each being connected to a suction device.

11. The structure as set forth in claim 10 further characterized by the terminal ends of the lower leg portions being arcuate shaped and directed inwardly and downwardly.

References Cited

UNITED STATES PATENTS

| | | | |
|---|---|---|---|
| 1,122,086 | 12/1914 | Dunlop | 32—33 XR |
| 2,315,748 | 4/1943 | Thompson | 32—17 |
| 2,823,455 | 2/1958 | Sprague | 32—33 |

ROBERT PESHOCK, Primary Examiner